United States Patent
Rupp et al.

(10) Patent No.: US 8,899,373 B2
(45) Date of Patent: Dec. 2, 2014

(54) POWER STEERING SYSTEM, IN PARTICULAR FOR A MOTOR VEHICLE

(71) Applicant: ZF Lenksysteme GmbH, Schwaebisch Gmuend (DE)

(72) Inventors: Arthur Rupp, Huettlingen (DE); Steffen Truthmann, Magdeburg (DE)

(73) Assignee: ZF Lenksystem GmbH, Schwaebisch Gmuend (DE)

( * ) Notice: Subject to any disclaimer, the term of this patent is extended or adjusted under 35 U.S.C. 154(b) by 0 days.

(21) Appl. No.: 13/888,807

(22) Filed: May 7, 2013

(65) Prior Publication Data

US 2013/0248279 A1    Sep. 26, 2013

Related U.S. Application Data

(63) Continuation of application No. PCT/EP2011/068500, filed on Nov. 7, 2011.

(30) Foreign Application Priority Data

Nov. 19, 2010   (DE) .......................... 10 2010 044 168

(51) Int. Cl.
| | |
|---|---|
| B62D 5/04 | (2006.01) |
| F16C 35/077 | (2006.01) |
| F16C 27/06 | (2006.01) |
| F16C 35/073 | (2006.01) |
| F16C 19/06 | (2006.01) |
| F16H 25/20 | (2006.01) |

(52) U.S. Cl.
CPC ........... *B62D 5/0403* (2013.01); *F16C 2208/60* (2013.01); *F16C 35/077* (2013.01); *F16H 2025/2031* (2013.01); *F16C 27/066* (2013.01); *F16C 2202/24* (2013.01); *F16C 35/073* (2013.01); *F16C 19/06* (2013.01); *F16C 2208/02* (2013.01); *B62D 5/0448* (2013.01)
USPC .......................................... 180/444; 384/476

(58) Field of Classification Search
USPC ................. 180/444, 443, 417, 420; 384/476; 74/388 PS
See application file for complete search history.

(56) References Cited

U.S. PATENT DOCUMENTS

| | | | | |
|---|---|---|---|---|
| 6,178,839 | B1 * | 1/2001 | Yoshida et al. | 74/424.87 |
| 6,659,219 | B2 * | 12/2003 | Okada et al. | 180/444 |
| 6,883,635 | B2 * | 4/2005 | Lynn et al. | 180/444 |
| 7,025,169 | B2 * | 4/2006 | Tatewaki et al. | 180/444 |

(Continued)

FOREIGN PATENT DOCUMENTS

| | | |
|---|---|---|
| DE | 102 02 483 | 8/2003 |
| DE | 103 10 492 | 9/2004 |

(Continued)

*Primary Examiner* — Joseph M Rocca
*Assistant Examiner* — Gabriela C Craciun
(74) *Attorney, Agent, or Firm* — Jordan and Hamburg LLP

(57) ABSTRACT

In a power steering system, in particular for a motor vehicle, comprising a servo-motor, which drives an axially displaceable component by way of a steering nut that is mounted rotatably, but axially non-displaceably in a gear housing, the steering nut is mounted in the gear housing in a radial bearing comprising an inner ring and an outer ring. A heat-insulating intermediate element is disposed between the outer ring of the radial bearing and the gear housing, or a cover of the gear housing, and/or between the inner ring of the radial bearing and the steering nut for the purpose of thermal decoupling.

7 Claims, 1 Drawing Sheet

(56) References Cited

U.S. PATENT DOCUMENTS

| | | |
|---|---|---|
| 7,240,763 B2 * | 7/2007 | Tatewaki et al. ............... 180/444 |
| 7,401,678 B2 * | 7/2008 | Yuasa et al. .................... 180/444 |
| 8,307,940 B2 * | 11/2012 | Bugosh et al. ................. 180/444 |
| 2002/0028033 A1 * | 3/2002 | Takemura et al. ............. 384/476 |
| 2003/0121714 A1 | 7/2003 | Okada et al. |
| 2006/0191738 A1 * | 8/2006 | Eda et al. ...................... 180/444 |
| 2007/0102228 A1 * | 5/2007 | Shiina et al. .................. 180/444 |
| 2011/0127742 A1 * | 6/2011 | Bae et al. .................. 280/93.513 |
| 2013/0248279 A1 * | 9/2013 | Rupp et al. .................... 180/444 |
| 2014/0027197 A1 * | 1/2014 | Kikuchi et al. ................ 180/444 |

FOREIGN PATENT DOCUMENTS

| | | |
|---|---|---|
| DE | 10 2004 034 701 | 2/2006 |
| DE | 10 2006 037 479 | 2/2008 |
| DE | 10 2008 041 872 | 3/2010 |
| EP | 1 457 405 | 9/2004 |
| EP | 2 049 383 | 4/2009 |
| WO | WO-2011/115691 | 9/2011 |
| WO | WO-2011/154435 | 12/2011 |

* cited by examiner

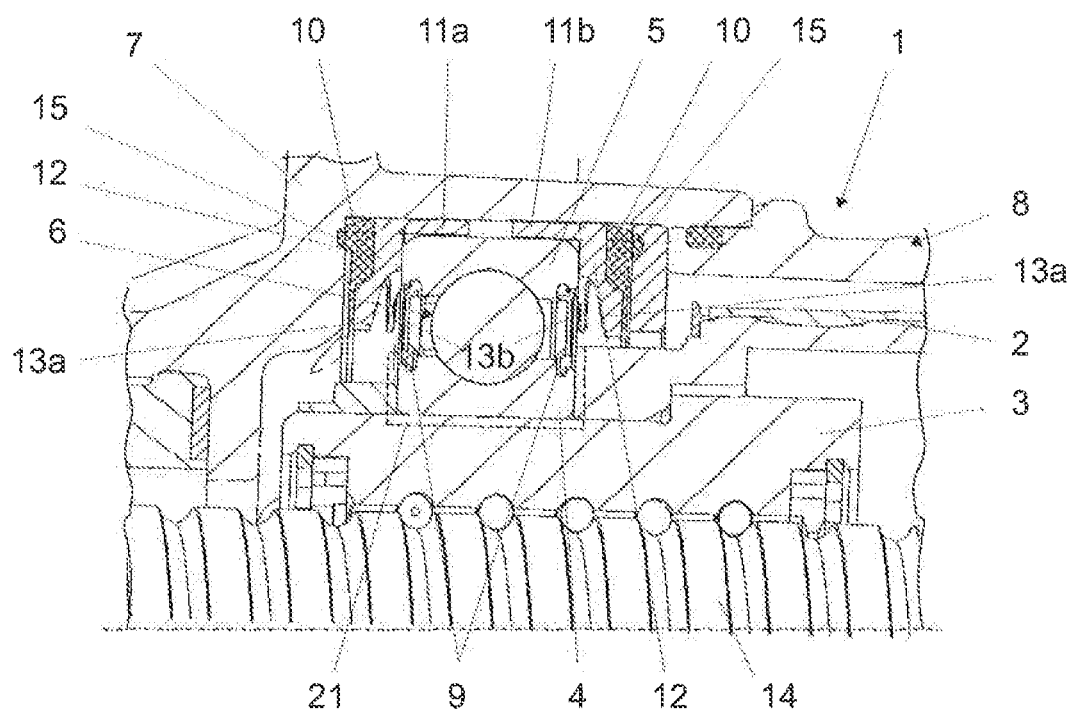

POWER STEERING SYSTEM, IN PARTICULAR FOR A MOTOR VEHICLE

This is a Continuation of PCT/EP2011/069500 filed Nov. 7, 2011.

BACKGROUND OF THE INVENTION

The invention relates to a power steering system, in particular for a motor vehicle.

A power steering system of the type in question is described in EP 2 049 383 B1.

Similar power steering systems are also known from DE 103 10 492 A1 and DE 102 02 483 A1.

Power steering systems of this type generally face the problem of heat development in the steering system. Differing temperatures between the inner ring of the radial bearing and the outer ring or the bearing seat, and ensuing differing levels of expansions, can result in micro-movements. This has an adverse effect in terms of noise development. In addition, fretting corrosion can occur.

It is the object of the present invention to prevent differing temperatures in the radial bearing, notably between the inner ring and the outer ring.

SUMMARY OF THE INVENTION

The solutions disclosed according to the invention allow major temperature differences between the inner ring and the outer ring to be avoided. One of the disclosed solutions is that of achieving thermal decoupling with respect to the outside by disposing a heat-insulating intermediate element between the gear housing or the cover of the gear housing, depending on the design of the gearbox. Less heat is thus supplied to the outer ring, whereby thorough heating of the radial bearing is avoided.

Because the inner ring is connected to the steering nut, which generally is a ball nut, heat can be appropriately dissipated from the radial bearing by way of the inner ring, due to the large mass of the steering nut, and the parts connected thereto.

According to the second solution, the inner ring is thermally decoupled from the steering nut by way of an intermediate element that is disposed between the steering nut and the inner ring. As heat enters via the outer ring, the heat also very quickly thoroughly penetrates the inner ring, whereby temperature differences in the radial bearing are likewise prevented.

Of course it is also possible, in a third solution, to decouple both the outer ring and the inner ring with respect to the respective surrounding gearbox part by way of a respective heat-insulating intermediate element.

The intermediate element can be substantially designed as a one or two-piece annular element and can be applied to the outside of the outer ring, or to the inside of the inner ring, either as a separate part or with positive fit.

A positive connection can also, for example, be established by molding plastic material onto the inner ring and/or outer ring.

Likewise, it is possible to integrate the intermediate element in lateral bearing washers of the radial bearing.

Radial bearings of this type are generally closed by lateral bearing washers, which are located between the outer ring and the inner ring and prevent grease from exiting the radial bearing. Thermal decoupling can likewise be achieved by appropriately designing the bearing washers to have extensions, which enclose the outer ring and/or the inner ring at least partially.

Excellent thermal decoupling can be achieved according to one embodiment according to the invention by a design in which the intermediate element encloses both sides of the outer ring and/or the inner ring.

According to a very advantageous embodiment, for this purpose the enclosure ends in each case in two limbs that are arranged at an axial distance from each other, wherein the limb that is directed toward the outer ring or inner ring is elastically seated against the respective bearing washer.

Because the intermediate element, together with the limb, is elastically seated against the bearing washer, axial forces that develop are prevented from acting on the bearing washers and from potentially disadvantageously deforming these.

Another very advantageous embodiment of the invention can consist of providing cover disks that cover the radial bearing axially on both sides with a respective axial bead, which is seated against the gear housing or the cover.

Axial loads of the steering rack can thus be transmitted into the gear housing or the cover, depending on the design of the gearbox, by way of the beads that are provided on both sides, without impairing the radial bearing.

According to a further embodiment of the invention, the intermediate element may be designed as a two-piece annular element, wherein the two annular elements are disposed next to each other at an axial distance.

When loads occur, these would negatively affect the intermediate element in the case of a single-piece intermediate element, which extends over the entire axial width of the radial bearing. However, if a gap or axial distance is present, which can also be kept to a minimum if need be, any loads that occur can be conducted through the outer ring, for example, and more particularly without forces also being conducted into the other inner ring.

A variety of materials are conceivable so as to achieve thermal decoupling by way of the intermediate element. An advantageous embodiment employs plastic material, such as polyamide comprising glass fiber and carbon fiber filling, for the intermediate element.

The power steering system according to the invention can be used for all types of power steering systems in a motor vehicle, such as a power steering system comprising an axially parallel drive, for example.

An exemplary embodiment of the invention will be described schematically hereafter based on the drawing.

BRIEF DESCRIPTION OF THE DRAWING

FIG. 1 shows a partial longitudinal section through a power steering system according to the invention.

DESCRIPTION OF THE PREFERRED EMBODIMENTS

Because the design of power steering systems for motor vehicles is generally known, only the parts that are essential for the invention will be addressed in more detail hereafter. In addition, reference is made to the power steering systems mentioned at the beginning.

A power steering system 1 of a type that is not shown in detail is connected to a steering nut, this being a ball nut 3, by way of a pulley 2. The ball nut 3 is radially mounted in a cover 7 of a steering gear housing 8 by way of an inner ring 4 and an outer ring 5 of a radial bearing 6, which is designed as a grooved ball bearing. Instead of mounting the radial bearing in the cover 7, it is, of course, also possible to mount the same in the gear housing 8.

The radial bearing 6 is sealed, laterally or axially, with respect to the outside by respective bearing washers 9, which are disposed between the inner ring 4 and the outer ring 5. In addition, lateral or axial cover disks 10 made of elastomer are provided.

An intermediate element in the form of a two-piece annular element 11a and 11b is disposed between the outer ring 5 of the radial bearing 6 and the cover 7. The two annular elements 11a and 11b are located at a small axial distance next to each other and are each provided with a radially inwardly extending enclosure 12. Radially inwardly directed, the enclosure 12 ends with two limbs 13a and 13b having a radially interposed gap. This embodiment provides elasticity, whereby the limb 13b, which is directed toward the respective associated bearing washer 9, is elastically seated against the bearing washer, in particular when axial forces develop.

The ball nut 3 is operatively connected to a ball screw section 14 of a spindle in the known manner. During rotation of the ball nut 3, the bail screw 14, and consequently the spindle, is axially displaced in the known manner.

On the side facing away from the radial bearing 6, the outsides of the two cover disks 10 are provided with an axial bead 15. The bead 15 can be designed as an annular bead and is pressed into an annular recess of the cover 7 or the gear housing 8. Axial forces that are introduced by the spindle or the ball screw 14 are thus transmitted into the cover 7 or into the gear housing 8.

For the purpose of thermal decoupling, the intermediate element, which is composed of the two annular elements 11a and 11b, can be made of polyamide comprising glass fiber and carbon fiber filling. For example, the proportion of the fillings can be 20% glass fiber filling and 15% carbon fiber filling.

Instead of an intermediate element between the outer ring 5 and the cover 7, an intermediate element 21 can be disposed, either additionally or in place thereof, between the inner ring 4 and the ball nut 3 for thermal decoupling (see the dotted illustration in the figure).

LIST OF REFERENCE NUMERALS 1 power steering system
2 pulley
3 steering nut
4 inner bearing
5 outer bearing
6 radial bearing
7 cover
8 steering gear housing
9 bearing washers
10 cover disks
11a, 11b intermediate element/annular element
12 enclosure
13a, 13b limbs
14 ball screw
15 bead
21 intermediate element

The invention claimed is:

1. A power steering system for a motor vehicle, comprising a servo-motor, which drives an axially displaceable component by way of a steering nut that is mounted rotatably, but axially non-displaceably in a gear housing, wherein the steering nut is mounted in the gear housing in a radial hearing comprising an inner ring and an outer ring, wherein a heat-insulating intermediate element is disposed between the outer ring of the radial bearing and the gear housing, or a cover of the gear housing, and/or between the inner ring oldie radial bearing and the steering nut for the purpose of thermal decoupling the intermediate element is provided with an enclosure, which ends in each case in two limbs that are arranged at an axial distance from each other, wherein the limb that is directed toward the outer ring or inner ring is elastically seated against a respective bearing washer; and wherein the cover disks that cover the radial bearing are provided axially on both sides with a respective axial bead, which is seated against the gear housing or the cover.

2. A power steering system according to claim 1, wherein the intermediate element is made of plastic material, and wherein polyamide comprising glass fiber and carbon fiber lining is provided as the plastic material.

3. The power steering system according to claim 1, wherein the intermediate element is substantially designed as a one- or two-piece annular element.

4. The power steering system according to claim 1, wherein the intermediate element is positively applied to the outer ring and/or inner ring.

5. The power steering system according to claim 1, wherein the intermediate element is integrated in the lateral bearing washers of the radial bearing.

6. A power steering system according to claim 1, wherein the intermediate clement encloses the outer ring and/or inner ring on both sides.

7. The power steering system according to claim 1, wherein the intermediate element is designed as a two-piece annular element, wherein the two annular elements are located at an axial distance next to each other.

\* \* \* \* \*